No. 607,373. Patented July 12, 1898.
L. S. HOLMES.
ROTARY MOTOR.
(Application filed Feb. 5, 1897.)
(No Model.) 4 Sheets—Sheet 1.
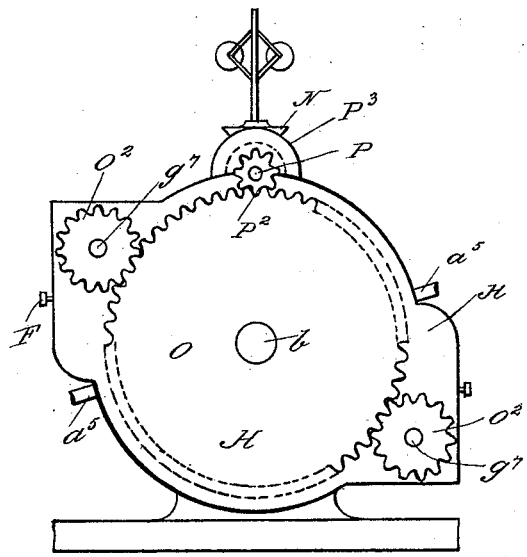
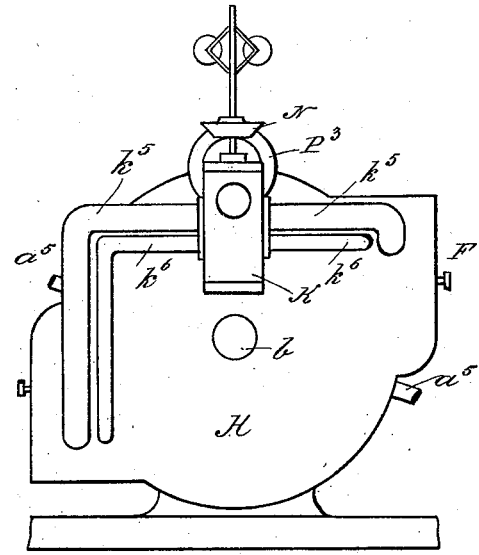
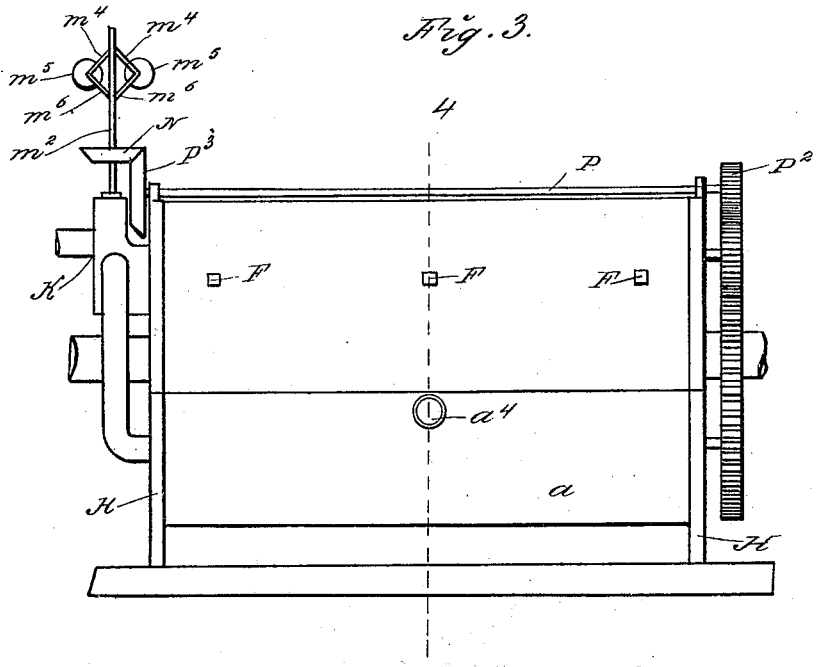
WITNESSES:
INVENTOR
ATTORNEYS
THE NORRIS PETERS CO., PHOTO-LITHO., WASHINGTON, D. C.

No. 607,373. Patented July 12, 1898.
L. S. HOLMES.
ROTARY MOTOR.
(Application filed Feb. 5, 1897.)
(No Model.) 4 Sheets—Sheet 2.
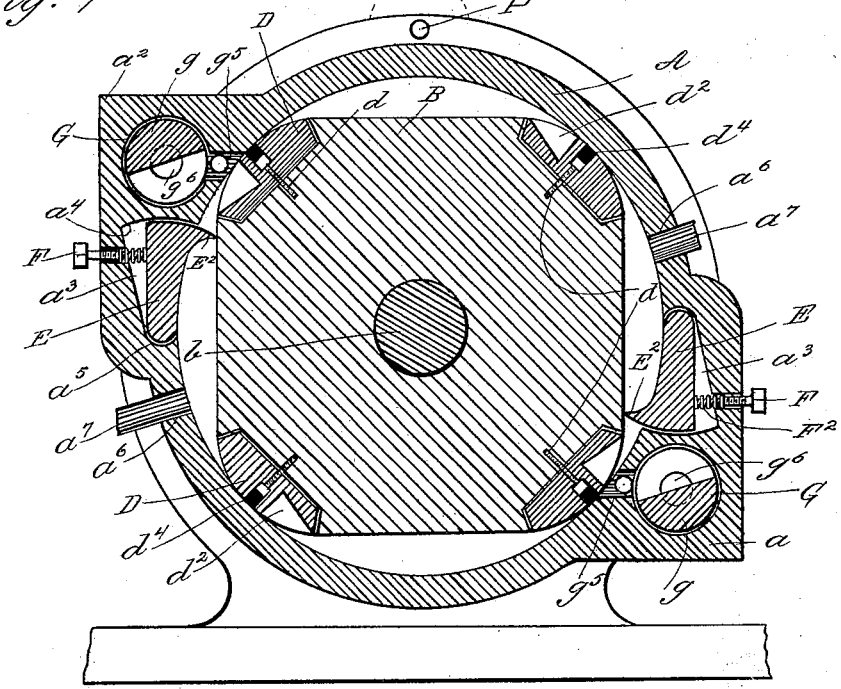
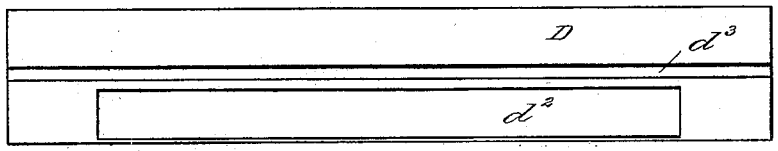
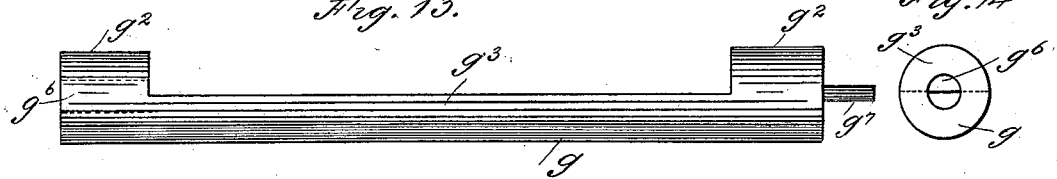
WITNESSES:
INVENTOR
Lyman S. Holmes
BY
Edgar Tate & Co
ATTORNEYS.

No. 607,373. Patented July 12, 1898.
L. S. HOLMES.
ROTARY MOTOR.
(Application filed Feb. 5, 1897.)

(No Model.) 4 Sheets—Sheet 3.

WITNESSES:
C. Vordfow
C. Gerst

INVENTOR
Lyman S. Holmes
BY
Edgar Tate
ATTORNEYS.

No. 607,373. Patented July 12, 1898.
L. S. HOLMES.
ROTARY MOTOR.
(Application filed Feb. 5, 1897.)
(No Model.) 4 Sheets—Sheet 4.
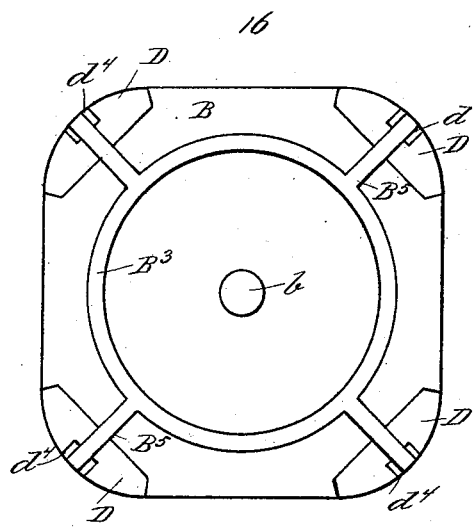
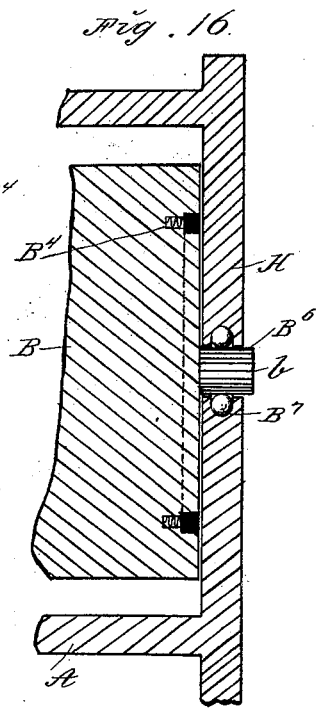
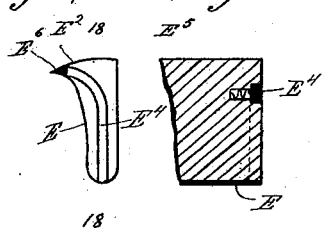
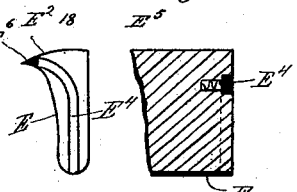
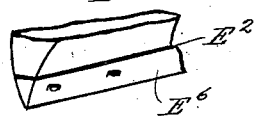
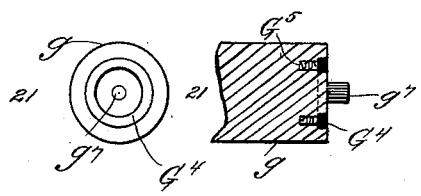
WITNESSES
INVENTOR
Lyman S. Holmes
BY
Edgar Tate & Co
ATTORNEYS.

UNITED STATES PATENT OFFICE.

LYMAN S. HOLMES, OF SCHOHARIE, NEW YORK.

ROTARY MOTOR.

SPECIFICATION forming part of Letters Patent No. 607,373, dated July 12, 1898.

Application filed February 5, 1897. Serial No. 622,215. (No model.)

*To all whom it may concern:*

Be it known that I, LYMAN S. HOLMES, a citizen of the United States, and a resident of Schoharie, in the county of Schoharie and State of New York, have invented certain new and useful Improvements in Rotary Motors, of which the following is a specification, reference being had to the accompanying drawings, forming a part thereof, in which similar letters of reference indicate corresponding parts.

This invention relates to rotary motors; and the object thereof is to provide an improved motor of this class which is simple in construction and operation, a further object being to provide a rotary motor which is comparatively inexpensive and very durable and powerful and compact in form and in which the steam or other agent by which the motor is operated is introduced simultaneously on diametrically opposite sides of the pistons, whereby the friction and jar are reduced to a minimum, and in which there is no dead-center and in which the admission of the steam is self-regulating; and with these and other advantages in view the invention consists in the construction, combination, and arrangement of parts hereinafter described and claimed.

The invention is fully disclosed in the following specification, of which the accompanying drawings form a part, in which—

Figure 5:
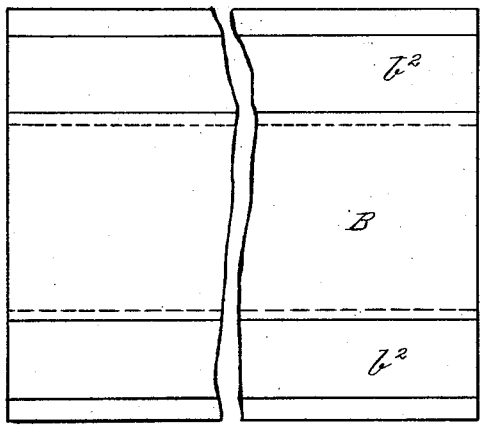
Figure 6:
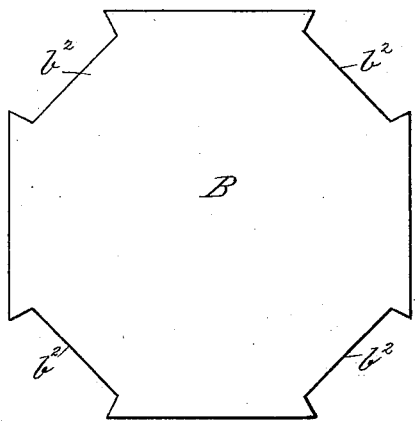
Figure 7:
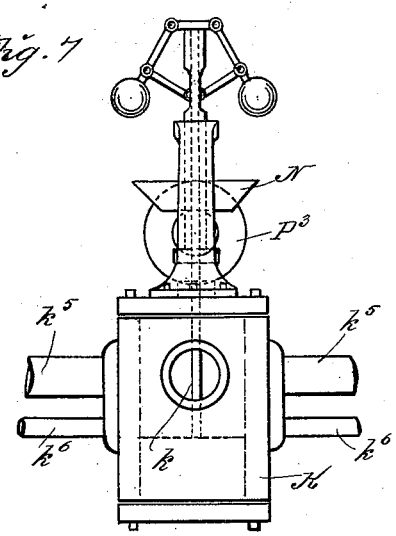
Figure 8:
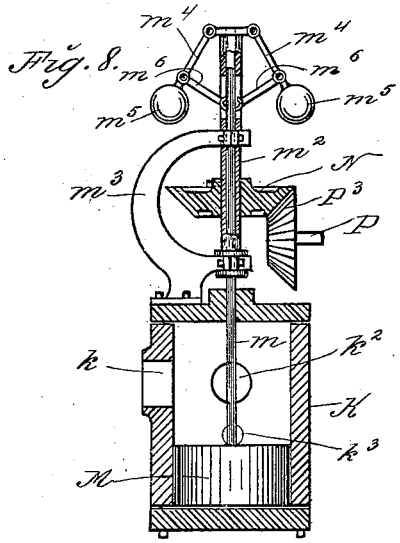

Figure 1 is an elevation of one end of my improved rotary motor; Fig. 2, a similar view of the opposite end; Fig. 3, a side view thereof; Fig. 4, a section on the line 4 4 of Fig. 1. Fig. 5 is a side view of the piston employed; Fig. 6, an end view thereof; Fig. 7, a front elevation of the governor which is connected with the motor and forms a part thereof; Fig. 8, a central vertical section thereof; Fig. 9, an outside view of a piston-head which I employ, four of which are provided; Fig. 10, an end view thereof; Fig. 11, a side view of an abutting valve which forms a part of my improved motor; Fig. 12, an end view thereof; Fig. 13, a side view of a regulating or cut-off valve, two of which are employed; Fig. 14, an end view thereof; Fig. 15, an end view of the revoluble piston and piston-heads, showing the method of packing the same; Fig. 16, a section on the line 16 of Fig. 15, showing also the end of the casing in which the piston is mounted; Fig. 17, an end view of one of the abutting valves, showing the method of packing the same; Fig. 18, a section on the line 18 thereof; Fig. 19, a perspective view of a part thereof; Fig. 20, an end view of one of the regulating or cut-off valves, showing the method of packing the same; and Fig. 21, a section on the line 21 thereof.

In the practice of my invention I provide a cylindrical casing A, at one side of which and near the bottom thereof is formed a longitudinal shoulder or projection $a$ and at the opposite side and near the top thereof a similar longitudinal shoulder or projection $a^2$, and mounted in the cylindrical casing A is a revoluble piston B, which is mounted on a shaft $b$, and the piston B is substantially square in cross-section, and the corners thereof are cut out to form longitudinal chambers $b^2$, in each of which is mounted a piston-head D, each of which is held in place by screws $d$, and each of which is provided at one side thereof with an oblong triangular chamber $d^2$.

The inner sides of the piston-heads D are so formed as to correspond with the shape or form of the longitudinal chambers $b^2$, and the outer surfaces thereof are convex or circular in cross-section, and the circle on which said surface is formed being of much smaller diameter than the inner diameter of the cylindrical casing A, and each of the piston-heads D is provided centrally of the convex outer surface with a longitudinal slot or groove $d^3$, in which is placed a strip of packing material $d^4$.

Formed in the lower portion of the longitudinal shoulder or projection $a^2$ and in the inner side thereof is a longitudinal chamber $a^3$, which is substantially triangular in cross-section and the upper wall of which is circular in cross-section, as shown at $a^4$, and the lower wall thereof is rounded out longitudinally, so as to form a longitudinal cavity or recess $a^5$, the bottom of which is segmental in cross-section, and mounted in the chamber $a^3$ is an abutting valve E, the upper and lower sides of which are so formed as to conform to the upper and lower walls of the chamber $a^3$ and the upper side of which is also provided with an inwardly-directed longitudinal flange or projection $E^2$. A similar chamber $a^3$ is formed in the longitudinal shoulder or projection $a$ at the opposite side, and a similar abutting valve E is placed therein; but in this case the larger portion of the chamber E is directed downwardly, and the abutting valve E is inverted, so that the longitudinal flange or projection $E^2$ is on the lower side thereof, and each of these abutting valves, which are located on the opposite sides of the cylinder, is provided with regulating screws or bolts F, which pass through the outer sides of the casing, as clearly shown in Figs. 3 and 4, and at the inner ends of each of the screws or bolts F is a spring $F^2$, which bears upon the abutting valves E and which, together with the steam therein, is adapted to force the longitudinal flanges or projections $E^2$ thereof inwardly, so that they will come in contact at all times with the surface or surfaces of the revoluble piston B and the heads D thereof.

Within the longitudinal shoulder or projection $a^2$ above the chamber $a^3$ is a bore or longitudinal chamber G, and in the lower portion of the longitudinal shoulder or projection $a$ and below the chamber $a^3$, formed therein, is a similar bore or circular passage G, in each of which is placed a cut-off valve $g$, which is of the form shown in Figs. 4, 13, and 14, and the ends of which are cylindrical in form, as shown at $g^2$, and the central portion of which is cut out longitudinally, so that said central portion in cross-section represents the half of a circle, as shown at $g^3$, and communicating with the bores or circular chambers G in each of the longitudinal shoulders or projections $a$ and $a^2$ is a longitudinal passage $g^5$, which extends from the longitudinal bore or chamber G and which communicates throughout its length with the interior of the cylinder A.

Each of the cut-off valves $g^3$ is provided at one end with a central bore or passage $g^6$ and at the other with a tenon or extension $g^7$, and, as will be observed on referring to Figs. 1, 2, and 3, the cylinder A and the longitudinal shoulders or projections $a$ and $b$ are provided with end pieces or heads H, which are bolted thereto, and it will be understood that the longitudinal chambers $a^3$, in which the abutting valves E are placed, and the longitudinal bores or chambers G, in which the cut-off valves $g$ are placed, extend only through said longitudinal shoulders or projections, and that the ends thereof are closed by the end pieces or heads H, and formed at diametrically opposite points in the sides of the cylinder below the longitudinal shoulder or projection $a^2$ and above the longitudinal shoulder or projection $a$ are exhaust-passages $a^6$.

I also employ a steam-chest K, which is suitably supported at or secured to one end of the cylinder or to one of the end plates or heads H, near the top thereof, and into which the steam is first conducted through a port or opening $k$ in the front thereof, and which is provided at opposite sides with a large port or opening $k^2$, immediately below which is a smaller port or opening $k^3$, with the first of which communicates a large steam-pipe $k^5$, and with the latter of which communicates a smaller steam-pipe $k^6$, and the steam-pipe $k^5$ at one end communicates with the cut-off valve $g$ in the longitudinal shoulder or projection $a$ through the end port or opening $g^6$, formed therein, and the corresponding end of the pipe $k^6$ communicates with the corresponding end of the passage $g^5$ in said longitudinal shoulder or projection $a$, which forms a communication between the bore or circular passage G and the interior of the cylinder, and the opposite end of the pipe $k^5$ communicates with the cut-off valve $g$ in the longitudinal shoulder or projection $a^2$, and the corresponding end of the steam-pipe $k^6$ communicates with the corresponding end of the longitudinal passage $g^5$ in said longitudinal shoulder or projection $a^2$.

I also provide a governor, which is mounted on or connected with the steam-chest and which consists of a valve or piston M, mounted on the lower end of a piston-rod $m$, which extends upwardly through a tubular rod $m^2$, which is supported by a bracket $m^3$, to the upper end of which are pivotally secured arms $m^4$, to the lower ends of which are secured weights or balls $m^5$ and to which are also pivotally secured arms $m^6$, which are passed through slots in the opposite sides of the tubular rods $m^2$ and pivotally connected with the piston-rod M, and mounted on the tubular rod $m^2$, between the separate arms or brackets $m^3$, is a beveled gear-wheel N.

The piston-shaft $b$ of the piston B extends through each of the ends of the heads H, and mounted on the end thereof opposite the steam-chest K and the governor is a gear-wheel O, which is adapted to engage with small pinions or gear-wheels $O^2$, one of which is mounted on the tenons or extensions $g^7$ of each of the cut-off valves, and above the cylinder A and longitudinally thereof is mounted a shaft P, one end of which is provided with a pinion or gear-wheel $P^2$, which is also adapted to engage with the gear-wheel O and the opposite end of which is provided with a beveled gear-wheel $P^3$, which is adapted to engage with the beveled gear-wheel N on the tubular shaft $m^2$ of the governor.

The exhaust ports or passages $a^6$ in the opposite sides of the cylindrical casing A are each provided with exhaust-pipes $a^7$, as shown in Figs. 1 and 2, and the operation will be readily understood from the foregoing description when taken in connection with the accompanying drawings and the following statement thereof.

The normal position of the parts is that shown in Fig. 1, in which the steam when it passes from the pipes $k^5$ and $k^6$ into the cylinder is discharged through the longitudinal passages $g^5$ into the longitudinal triangular chambers $d^2$ in the adjacent piston-heads D and the piston is revolved in the direction of the arrow shown in Fig. 4, the abutting valves E serving to prevent the steam from passing in the opposite direction and thus causing it to force the piston to revolve in the direction of the arrow. It is possible for the motor to stop in such a position that the steam from the main cut-off valve $g$ could not enter the cylinder or the chambers $d^2$ in the piston-heads; but in this event the passages $g^5$ will still be open and the steam from the small pipe $k^6$ can enter said chambers $d^2$ and start the motor, and for this reason it will be observed that the passages $g^5$ constitute simple auxiliary or supplemental ports or passages, and this is also true of the smaller steam-pipe $k^6$, said pipe $k^6$ and the steam-passages $g^5$, with which it communicates, being simply supplementary, and as soon as the motor is started the steam will flow through the main pipe $k^5$ and the valves $g$.

The operation of the motor will also serve to operate the governor, as will be understood, through the gearing hereinbefore described, which is connected with the end of the piston-shaft $b$ and the governor, and by this operation the piston or valve M will be raised when the motor is in free operation and cut off the flow from the supplemental or auxiliary ports or passages $k^3$ in the side of the steam-chest which communicates with the passage $g^5$ in the cylinder, and the steam for running the motor will pass through the pipes $k^5$ and the valves $g$, hereinbefore described, and it will also be apparent that by the operation of the governor the amount of steam passing through the main pipe $k^5$ and the port or opening $k^2$ in the steam-chest which communicates therewith may be regulated, and thus the governor serves to regulate the operation of the motor at all times.

In Fig. 2 I have shown a method of packing one of the ends of the piston, both ends of which are similarly packed, in which I employ a circular packing-ring $B^3$, which is countersunk in the end of the piston, and said piston is also provided with an annular groove $B^4$, in which springs are placed, as shown in Fig. 16, for forcing the packing-ring $B^3$ outwardly into contact with the end H of the casing in which the piston is mounted, and connected with the packing-ring $B^3$ are radial arms $B^5$, formed from the same material, and which are also countersunk in the end of the piston and which pass outwardly radially through the ends of the piston-heads D and through the packing-strips $d^4$, and by means of this construction I avoid using a stuffing-box at $B^6$ and am consequently enabled to employ ball-bearings $B^7$.

In Figs. 17 and 18 I have shown the end of one of the abutting valves E, which is similarly provided with packing $E^4$, and this packing is also countersunk, and formed in the end of the abutting valve is a groove $E^5$, in which are also placed springs, which are designed to force the packing E outwardly into contact with the end H of the casing, and it will be understood that both ends of the abutting valves are similarly packed, and in Fig. 19 I have shown a perspective side view of one of the valves E, in which the edge $E^2$ is also provided with a strip of packing $E^6$, this construction being also shown in Fig. 17, and the packing $E^6$ may be secured to the edge of the valve in any desired manner.

In Figs. 20 and 21 I have shown, respectively, an end view and a section of one of the regulating or cut-off valves $g$, and these valves are also provided at each end with annular packing $G^4$, which is also countersunk, and formed in the ends of the valve are grooves $G^5$, in which are placed springs, which serve to force the packing $G^4$ outwardly, and it will be understood that each end of each of the regulating or cut-off valves is similarly provided, and the object of this construction, as in the case of the abutting valves E, is to provide means for packing the ends of these valves and for preventing steam from escaping through the ends H of the casing or from passing around the ends of the valve.

In the operation of my improved motor, as hereinbefore described, it will be observed that the abutting valves E or the longitudinal flanges or projections $E^2$, formed thereon, press upon the sides of the piston and also on the sides of the piston-head at all times, and the exhaust-steam after it has performed its functions passes through the exhaust-pipes $a^7$, and it will thus be seen that I accomplish the object of my invention by means of a device which is simple in construction and operation and which is also well adapted to accomplish the result for which it is intended.

It will also be observed that the steam is admitted simultaneously and at diametrically opposite sides of the cylinder and that consequently the jar and friction thereof are reduced to a minimum, and the distance from the axis of the piston is such that the steam has a greater force or leverage than could otherwise be produced and that the operation of the motor is self-regulating at all times.

It will also be apparent that the piston B may be circular in cross-section or of other forms than that shown and described, and many other changes in and modifications of the construction herein described may be made without departing from the spirit of my invention or sacrificing its advantages, and I reserve the right to make all such alterations in and modifications of the construction herein described as fairly come within the scope of the invention.

Having fully described my invention, I claim as new and desire to secure by Letters Patent—

1. A rotary motor, comprising a cylindrical casing which is closed at both ends by end plates secured thereto, said casing being also provided at opposite sides with longitudinal abutting-valve chambers which open inwardly, and which are triangular in cross-section, spring-operated abutting valves pivoted in said chambers, said valves being also triangular in cross-section, said casing being also provided at opposite sides and above and below said abutting-valve chambers with longitudinal circular cut-off chambers which are in communication with the interior of said casing, and with longitudinal steam-passages which are arranged between said cut-off-valve chambers and the interior of said casing, and which communicate with said cut-off-valve chambers, and the interior of said casing, cut-off valves mounted in said cut-off-valve chambers, a shaft passing longitudinally through said casing, a piston mounted on said shaft within said casing, said piston being oblong in form and rectangular in cross-section, and the corners thereof, being provided with longitudinal chambers, piston-heads mounted in said longitudinal chambers which are circular on their outer surfaces, and provided at one side with longitudinal chambers which are triangular in cross-section, a steam-chest mounted at one end of said casing, and provided with pipes which are in communication with said cut-off-valve chambers, and said steam-passages, and a governor connected with said steam-chest, and provided with a piston or valve which operates therein to control the passage of steam into said steam-pipes, said governor being in operative connection with the main shaft, and devices in operative connection with said governor for opening and closing said cut-off valves, substantially as shown and described.

2. A rotary motor comprising a cylindrical casing which is closed at both ends by end plates secured thereto, longitudinal spring-operated abutting valves pivoted in valve-chambers in said casing at the opposite sides thereof, cut-off valves mounted in circular longitudinal cut-off-valve chambers formed in the opposite sides of said casing above and below said abutting-valve chambers, and which are in communication with the interior of said casing, said casing being also provided with steam-passages which are formed therein, between said cut-off-valve chambers, and the interior of said casing, and which are in communication with said cut-off-valve chambers, and the interior of said casing, a shaft which passes longitudinally through said casing, and which is provided with a piston, said piston being oblong and rectangular in form, and provided with longitudinal piston-heads at each corner thereof, a steam-chest mounted at the end of said casing, and provided with pipes which are in communication with said cut-off-valve chambers, and said steam-passages, and a governor connected with said steam-chest, and provided with a piston or valve which operates to control the passage of steam into said steam-pipes, said governor being in operative connection with the main shaft, and with devices for operating said cut-off valves, substantially as shown and described.

3. A rotary motor comprising a cylindrical casing which is closed at both ends by end plates secured thereto, longitudinal spring-operated abutting valves pivoted in valve-chambers in said casing at the opposite side thereof, cut-off valves mounted in circular longitudinal cut-off-valve chambers formed in the opposite sides of said casing above and below said abutting-valve chambers, and which are in communication with the interior of said casing, said casing being also provided with steam-passages which are formed therein, between said cut-off-valve chambers, and the interior of said casing, and which are in communication with said cut-off-valve chambers, and the interior of said casing, a shaft which passes longitudinally through said casing, and which is provided with a piston, said piston being oblong and rectangular in form, and provided with longitudinal piston-heads at each corner thereof, a steam-chest mounted at the end of said casing, and provided with pipes which are in communication with said cut-off-valve chambers, and said steam-passages, and a governor connected with said steam-chest, and provided with a piston or valve which operates to control the passage of steam into said steam-pipes, said governor being in operative connection with the main shaft, and with devices for operating said cut-off valves, said piston-heads and said abutting valves being also provided with packing, and the ends of said steam-passages and said valve-chambers being closed by the end plates of the cylinder, substantially as shown and described.

In testimony that I claim the foregoing as my invention I have signed my name, in presence of the subscribing witnesses, this 20th day of July, 1896.

LYMAN S. HOLMES.

Witnesses:
HENRY CADY,
ARTHUR D. MEAD.